United States Patent Office 3,325,564
Patented June 13, 1967

3,325,564
POLYMERISATION OF 2,3-DICHLOROBUTADIENE
James Charles Brunton, North Petherton, Somerset, and Michael Walter Bartlett, Bridgwater, Somerset, England, assignors to British Cellophane Limited, Bridgwater, Somerset, England, a British company
No Drawing. Filed Sept. 5, 1963, Ser. No. 306,708
Claims priority, application Great Britain, Sept. 12, 1962, 34,892/62
9 Claims. (Cl. 260—92.3)

This invention relates to the polymerisation of 2,3-dichlorobutadiene and, in particular, to the polymerisation of substantially pure 2,3-dichlorobutadiene to produce a polymer readily capable of being formed into fibres, filaments or films by melt extrusion and by casting from solvents.

It is known that an impure form of monomeric 2,3-dichlorobutadiene can be obtained by dehydrochlorinating 1,2,3,4-tetrachlorobutane with a mixture of potassium hydroxide and methyl alcohol. The impure monomer will readily polymerise, in the absence of polymerisation initiators, at elevated temperatures to produce an infusible, insoluble polymer which is incapable of being formed into shaped articles such as fibres, filaments or films by conventional methods. However, if the impure monomer is polymerised in an inert organic diluent, for example methyl alcohol, and in the presence of a polymerisation regulator, for example an organic sulphur compound, then a polymer is obtained which is melt extrudable and is toluene soluble.

The impurities, however, in the monomeric 2,3-dichlorobutadiene persist in the polymer and are most difficult to separate. These impurities affect the properties of the polymer adversely to such an extent that in certain uses inferior products result. For example, films of impure poly-2,3-dichlorobutadiene are more permeable to water vapour than films of substantially pure poly-2,3-dichlorobutadiene.

Surprisingly, when a substantially pure monomeric 2,3-dichlorobutadiene is polymerised in an inert organic diluent in the presence of an organic sulphur compound polymerisation regulator, the polymer obtained cannot readily be melt-extruded into shaped articles. The polymer is, however, soluble in certain solvents such as toluene but shaped articles formed from a solution of the polymer have an objectionable odour due to the use of the organic sulphur compound.

A method of preparing a substantially pure monomeric 2,3-dichlorobutadiene by dehydrochlorinating 1,2,3,4-tetrachlorobutane in the presence of an organic base having a dissociation constant higher than $10^{-7}$ in aqueous solution at 25° C., such as piperidine, is described in United States patent application No. 253,263, filed Jan. 23, 1963.

By the method of the present invention, it has now been found possible to polymerise pure or substantially pure monomeric 2,3-dichlorobutadiene as well as the impure forms of 2,3-dichlorobutadiene of the prior art to form a polymer which is free from objectionable odour. Further over a certain range of inherent viscosity the polymer is readily melt-extrudable into shaped articles.

Accordingly, the present invention provides a method for the production of a polymer of 2,3-dichlorobutadiene comprising polymerising monomeric 2,3-dichlorobutadiene in the presence of an aromatic nitro compound having the formula:

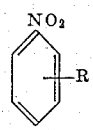

where R is hydrogen, chlorine or a methyl group, at such a temperature that the inherent viscosity of the poly-2,3-dichlorobutadiene is above 0.1.

The term "inherent viscosity of the polymer" means the inherent viscosity of the polymer when measured in a solution of toluene containing 0.5% by weight of the polymer at 50° C.

Examples of suitable aromatic nitro compounds are nitrobenzene, ortho chloronitrobenzene and ortho meta and para nitrotoluene.

The poly 2,3-dichlorobutadiene prepared in accordance with the invention may readily be dissolved in certain organic solvents, for example toluene and carbon tetrachloride to form solution from which shaped products can be formed, for example, films by casting and fibres and filaments by wet or dry spinning methods.

When the temperature of polymerisation is such that the inherent viscosity of the polymer lies in the range between 0.1 and 1.5, it is found that the polymer is readily formed into shaped products such as fibres, filaments and films by melt extrusion techniques. The shaped products prepared either by casting from solution or by melt-extrusion are free from objectionable odour.

If the inherent viscosity of the poly-2,3-dichlorobutadiene is below 0.1, the physical properties of the shaped articles produced by casting from a solvent or by melt extrusion are so poor that they have little commercial value. If the inherent viscosity of the poly-2,3-dichlorobutadiene is above 1.5 degradation of the polymer commences to take place when melt extrusion is attempted.

In order to obtain a melt-extrudable polymer the temperature of the polymerisation recreation preferably lies within the range between 40° C. and 100° C., and more preferably, between 60° and 80° C. As the temperature of the reaction mixture increases, the molecular weight and hence, the inherent viscosity of the poly-2,3-dichlorobutadiene decreases.

Preferably, the temperature is so selected that the inherent viscosity of the polymer lies in the range between 0.25 and 1.00 and, more preferably between 0.3 and 0.8.

The quantity by weight of the aromatic nitro compound used in the polymerisation mixture should be at least equal to the weight of the monomeric 2,3-dichlorobutadiene and may be up to eight or ten times the weight of the monomer. When the quantity of aromatic nitro compound used is low, there is difficulty in polymerisation due to high viscosity of the reaction mixture preventing rapid distribution of heat. When considerable quantities of the aromatic nitro compound are used, there is a trend towards reducing the molecular weight and hence, the intrinsic viscosity of the poly-2,3-dichlorobutadiene produced during the reaction. Consequently, the quantity by weight of aromatic nitro compound employed should preferably lie in the range between 2 and 8 times the weight of the 2,3-dichlorobutadiene.

In a preferred form of the invention, a free radical initiator is added to the reaction mixture which is capable of producing free radicals on being heated to its decomposition temperature. Examples of suitable free radical initiators are organic peroxides such as lauroyl peroxide or azo compounds such as azobisisobutyronitrile. The quantity of initiator used has an effect upon the molecular weight and hence, the inherent viscosity of the poly-2,3-dichlorobutadiene. If the proportion of initiator to monomeric 2,3-dichlorobutadiene is low, the molecular weight and hence, the inherent viscosity of the polymer will tend to be high. Similarly, if the proportion of initiator to monomeric 2,3-dichlorobutadiene is high, the molecular weight and the inherent viscosity of the polymer will tend to be low.

When lauroyl peroxide is used as the initiator, a suitable proportion of the initiator lies in the range between 0.5% and 5% by weight of the monomeric 2,3-dichlorobutadiene. When azobisisobutyronitrile is the initiator a suitable proportion by weight lies in the range between 0.1% and 1% by weight of the monomeric 2,3-dichlorobutadiene.

Further, when an initiator is used in the polymerisation reaction, it is important that the temperature of the reaction is above the temperature at which the initiaor decomposes to form free radicals.

Both lauroyl peroxide and azobisisobutyronitrile will produce free radicals when the polymerisation reaction takes place above 40° C. and preferably the reaction takes place at a temperature within the range between 60° and 80° C.

The present invention also includes shaped articles, for example fibres, filaments and films when manufactured from poly-2,3-dichlorobutadiene produced in accordance with the method of the present invention.

Specific methods of carrying out the present invention will now be described by way of the following examples.

EXAMPLE 1

10 grams of substantially pure 2,3-dichlorobutadiene obtained by the dehydrochlorination of 1,2,3,4-tetrachlorobutane in the presence of piperidine was introduced into a polymerisation bottle with 40 grams of nitrobenzene and 0.1 gram of lauroyl peroxide. The bottle, with its contents after ebing flushed out with nitrogen was agitated in a water bath at 40° C. for 18 hours. The reaction product was cooled to room temperature until it adopted a gel-like state when it was added with agitation to a quantity of methyl alcohol. The poly-2,3-dichlorobutadiene precipitated out as a fine powder which was separated, washed and dried. The yield was 59% by weight. The inherent viscosity of the polymer (measured in solution in toluene containing 0.5% by weight of the polymer at 50° C.) was 0.88.

The polymer was readily melt extruded at 170°–180° C. to form a clear filament and readily dissolved in toluene to form a solution from which a clear film was cast on to a glass plate. The products were free of an objectionable odour.

EXAMPLE 2

The procedure as described in Example 1 was repeated with the exception that 0.05 gram of lauroyl peroxide was used and the polymerisation reaction was carried out at 60° C. The yield of substantially pure poly-2,3-dichlorobutadiene was 89% by weight and the inherent viscosity was 0.69. The poly 2,3-dichlorobutadiene was readily melt-extruded to form a clear filament at 170°–180° C. and dissolved readily in toluene to form a solution from which a clear film was cast on to a glass plate. The film was free of any objectionable odour.

EXAMPLE 3

The procedure described in Example 2 was repeated with the exception that the quantity of nitrobenzene used was 80 grams. The yield of poly-2,3-dichlorobutadiene was 72% by weight and the inherent viscosity was 0.66. The polymer was readily melt extruded into a clear filament at 170°–180° C. and could be cast into clear films from a solution in toluene. The products were free of any objectionable odour.

EXAMPLE 4

The procedure described in Example 1 was repeated except that the polymerisation initiator employed was 0.05 gram of azobis-isobutyronitrile and the polymerisation reaction was carried out at 66° C. for 3½ hours. The yield of poly-2,3-dichlorobutadiene was 90% and the inherent viscosity was 0.70. The polymer was melt extrudable at 150°–160° C. and dissolved readily in toluene. The polymer and products formed from the polymer were free from any objectionable odour.

EXAMPLE 5

10 grams of substantially pure monomeric 2,3-dichlorobutadiene (as used in Example 1) was mixed with 40 grams of o-chloronitrobenzene and 0.1 gram of lauroyl peroxide in a flask fitted with a stirrer and a reflux condenser. The mixture was stirred in an atmosphere of nitrogen while the flask was held at a temperature of 63° C. for a period of 18 hours. At the end of the polymerisation period, the substantially pure poly 2,3-dichlorobutadiene was separated by the method described in Example 1 and dried. The yield was 95% and the inherent viscosity was 0.60. The polymer was readily melt-extruded at 155° C. to form a clear filament and a clear film. The polymer was also toluene soluble and capable of being wet spun to form a filament and cast on to a glass plate to form a film. The products were free from any objectionable odour.

EXAMPLE 6

The procedure described in Example 5 was repeated except that the organic solvent used was 40 grams of ortho-nitrotoluene. The yield of poly-2,3-dichlorobutadiene was 100% and the inherent viscosity of the polymer was 0.47. The polymer was readily melt extruded at 155°–165° C. to give clear filaments and films and readily dissolved in toluene from which clear films were cast on to a glass plate and filaments were wet spun. The products were free from any objectionable odour.

EXAMPLE 7

The procedure described in Example 6 was repeated with the exception that the organic solvent used was 40 grams of metanitrotoluene. The yield of poly-2,3-dichlorobutadiene was 98% and the inherent viscosity was 0.58. The polymer was readily melt extruded at 165° C. to give clear filaments and films and readily dissolved in toluene from which clear films were cast and filaments were wet spun. The products had no objectionable odour.

EXAMPLE 8

The procedure described in Example 6 was repeated with the exception that the organic solvent used was 40 grams of para-nitrotoluene and the polymerisation reaction was carried out at 62° C. The yield of poly-2,3-dichlorobutadiene was 96% and the inherent viscosity was 0.61. The polymer was readily melt extruded at 160° C. to give clear filaments and films and readily dissolved in toluene from which clear films were cast and filaments were wet spun. The products were free from any objectionable odour.

We claim:

1. A method for the production of a polymer of 2,3-dichlorobutadiene comprising polymerising monomeric 2,3-dichlorobutadiene in the presence of a free radical initiator and an aromatic nitro compound having the general formula:

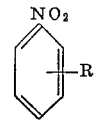

where R is a substituent group selected from hydrogen, chlorine and methyl at such a temperature that the inherent viscosity of the poly 2,3-dichlorobutadiene is above 0.1.

2. A method as claimed in claim 1 in which the aromatic nitro compound is nitrobenzene.

3. A method as claimed in claim 1 in which the temperature of the polymerisation is such that the inherent viscosity of the polymer lies in the range between 0.1 to 1.5.

4. A method as claimed in claim 3 in which the temperature of the polymerisation is such that the inherent viscosity of the polymer lies in the range between 0.3 to 0.8.

5. A method as claimed in claim 1 in which the polymerisation temperature lies in the range between 40° C. and 100° C.

6. A method as claimed in claim 1 in which the polymerisation temperature lies in the range between 60° C. and 80° C.

7. A method as claimed in claim 1 in which the weight of the aromatic nitro compound is from 2 to 8 times the weight of the monomeric 2,3-dichlorobutadiene.

8. A method as claimed in claim 1 in which the polymerisation initiator is lauroyl peroxide and is present in the reaction mixture in the range between 0.5% and 5% by weight of the monomeric 2,3-dichlorobutadiene.

9. A method as claimed in claim 1 in which the polymerisation initiator is azobis-isobutyronitrile and is present in the reaction mixture in the range between 0.1% and 1% by weight of the monomeric 2,3-dichlorobutadiene.

References Cited

UNITED STATES PATENTS

| | | | |
|---|---|---|---|
| 3,082,262 | 3/1963 | Scott | 260—92.3 |
| 3,098,844 | 7/1963 | Polishuk | 260—92.3 |

JOSEPH L. SCHOFER, *Primary Examiner.*

H. I. CANTOR, *Assistant Examiner.*